(No Model.)

T. W. PATTEN.
NUT LOCK.

No. 398,535. Patented Feb. 26, 1889.

WITNESSES:
Fred G. Dieterich
Edw. W. Byrn.

INVENTOR:
Thomas W. Patten
BY
Munn & Co
ATTORNEYS.

UNITED STATES PATENT OFFICE.

THOMAS W. PATTEN, OF BALTIMORE, MARYLAND.

NUT-LOCK.

SPECIFICATION forming part of Letters Patent No. 398,535, dated February 26, 1889.

Application filed October 17, 1888. Serial No. 288,341. (No model.)

*To all whom it may concern:*

Be it known that I, THOMAS W. PATTEN, of Baltimore city, in the State of Maryland, have invented a new and useful Improvement in Nut-Locks, of which the following is a specification.

My invention is in the nature of an improved nut-lock, designed especially for securing the fish-plates of railroad-rails, but applicable also to other uses; and it consists in the peculiar construction and combination of an eccentrically-recessed nut and a washer having an eccentric boss or projection fitting in the eccentric recess of the nut, and having on its inner side teeth extending crosswise the threads of the bolt and adapted to be forced into the same to lock the nut by a cam action between the eccentric portions of the nut and boss of the washer, as hereinafter fully described.

Figure 1:
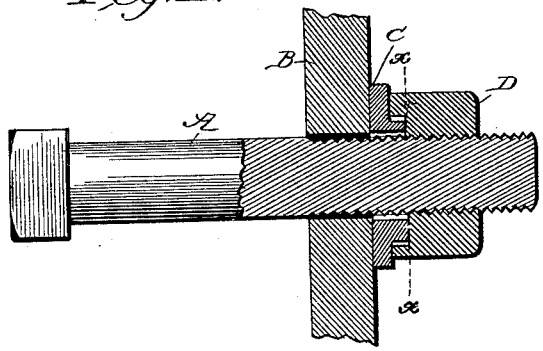
Figure 2:
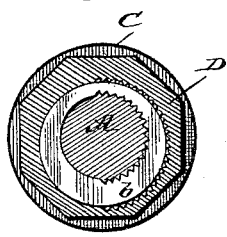
Figure 3:
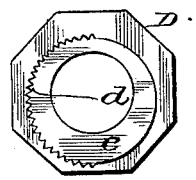
Figure 4:
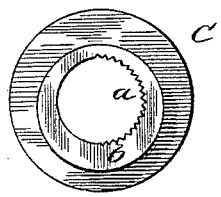

Figure 1 is a longitudinal section through the bolt and nut; Fig. 2, a transverse section through line *x x* of Fig. 1. Fig. 3 is an inside face view of the nut, and Fig. 4 is a view of the adjacent face of the washer.

A represents an ordinary bolt having a screw-threaded stem, and B is the fish-plate or other bearing against which the nut is to be screwed. C is the washer, and D the nut. The washer C occupies a position between the nut and the fish-plate, and has on one side of its central hole an eccentric boss, *b*, and has formed on its inner periphery transverse teeth or notches *a*, extending from the thinnest to the thickest part of the boss about half-way around the hole, these teeth being formed longitudinal to the bolt or at right angles to the threads thereof. The nut D has the usual screw-threaded hole adapted to fit upon and turn on the screw-threads of the bolt, but has its face which adjoins the washer recessed eccentrically at *c* to receive the boss *b* of the washer. The outer circumference of this recess is also toothed or serrated at *d* to engage with the outer surface of the boss on the washer.

The washer and boss may be made of malleable cast-iron, and the nut is hot-pressed to the desired shape.

In applying the nut-lock the washer is first placed on the bolt with its boss facing outwardly. The nut is then placed on the bolt and is turned up upon the threads of the same until it touches the boss of the washer, and as the latter is received in the eccentric recess of the nut the nut and washer both turn together until the washer begins to bind against the fish-plate or other bearing. As soon as this binding takes place, the washer being somewhat retarded in its revolution, a slight motion takes place between the eccentric surface of the boss on the washer and the recess in the nut, which causes the washer to be jammed with a cam action against the bolt, burying the teeth of the washer transversely into the threads of the bolt and locking the parts firmly together. The function of the set of teeth or serrations *d* on the nut is to engage with the outer surface of the boss on the washer and prevent any back motion of the nut.

I am aware that it is not new to recess one side of a nut with an eccentric depression and to place therein a smaller nut with an eccentric periphery to produce a cramping cam action, and I do not claim this arrangement.

Having thus described my invention, what I claim as new is—

1. A nut-lock consisting of a screw-threaded nut having an eccentric depression in one side, combined with a washer having an eccentric boss projecting laterally therefrom, and having on its inner periphery transverse teeth adapted to engage transversely the threads of a bolt, substantially as described.

2. A nut-lock consisting of a screw-threaded nut having an eccentric depression in its side with teeth *d*, combined with the washer having an eccentric boss on its side and transverse teeth *a* on its inner surface, substantially as and for the purpose described.

3. The combination, with the bolt, of the nut D, having an eccentric recess or depression, *c*, in its side, and the washer C, having an eccentric boss, *b*, on its side adapted to enter the recess of the nut, and having teeth or serrations on its inner periphery arranged transversely to the threads of the bolt, substantially as and for the purpose described.

THOMAS W. PATTEN.

Witnesses:
SOLON C. KEMON,
J. MIDDLETON.